United States Patent
Yamada

(10) Patent No.: US 8,134,348 B2
(45) Date of Patent: Mar. 13, 2012

(54) DC-DC CONVERTER

(75) Inventor: Shinichiro Yamada, Ikeda (JP)

(73) Assignee: Ricoh Company, Ltd., Tokyo (JP)

( * ) Notice: Subject to any disclaimer, the term of this patent is extended or adjusted under 35 U.S.C. 154(b) by 457 days.

(21) Appl. No.: 12/395,127

(22) Filed: Feb. 27, 2009

(65) Prior Publication Data

US 2009/0224745 A1    Sep. 10, 2009

(30) Foreign Application Priority Data

Mar. 10, 2008 (JP) ................... 2008-060005

(51) Int. Cl.
G05F 1/00 (2006.01)
(52) U.S. Cl. .................. 323/222; 323/283; 323/284
(58) Field of Classification Search .......... 323/222, 323/284, 283
See application file for complete search history.

(56) References Cited

U.S. PATENT DOCUMENTS

| 6,978,386 B2 * | 12/2005 | Gareis et al. ............ 323/282 |
| 7,012,412 B2 | 3/2006 | Kanamori et al. |
| 7,453,246 B2 * | 11/2008 | Qiu et al. .............. 323/282 |
| 7,831,851 B2 * | 11/2010 | Yoshii .................. 323/351 |

FOREIGN PATENT DOCUMENTS

| JP | 2000-69746 | 3/2000 |
| JP | 2003-219638 | 7/2003 |
| JP | 2004-229451 | 8/2004 |

OTHER PUBLICATIONS

U.S. Appl. No. 12/209,835, filed: Sep. 12, 2008.
Feb. 24, 2011 Chinese official action in connection with a counterpart Chinese patent application.
Oct. 27, 2010 Korean official action in connection with a counterpart Korean patent application.

* cited by examiner

*Primary Examiner* — Shawn Riley
(74) *Attorney, Agent, or Firm* — Cooper & Dunham LLP

(57) ABSTRACT

A DC-DC converter includes an error amplifying circuit to output an error signal by amplifying differences between a reference voltage and a feedback voltage for an output voltage generated by switching an output transistor between on and off, a triangular wave generation circuit to generate a triangular wave, a PWM comparison circuit to compares the triangular wave with the error signal and output a duty control signal having a duty ratio based on the comparison, a pulse width control circuit to control a pulse width of the duty control signal output from the PWM comparison circuit, and a drive circuit to drive the output transistor according to a signal output from the pulse width control circuit.

13 Claims, 7 Drawing Sheets

DC-DC CONVERTER

CROSS-REFERENCE TO RELATED APPLICATIONS

This patent specification claims priority from Japanese Patent Application No. 2008-060005, filed on Mar. 10, 2008 in the Japan Patent Office, the entire contents of which are hereby incorporated by reference herein.

BACKGROUND

1. Technical Field

This disclosure relates to a DC-DC (direct current to direct-current) converter that controls operations of a switching element based on an output voltage and maintains the output voltage within a predetermined range.

More particularly, the disclosure relates to a DC-DC converter that supplies operational power to various types of semiconductor integrated circuit (IC) devices, such as a central processing unit (CPU) and a memory (RAM, ROM, etc.), mounted on any of various types of electronic apparatuses. For example, applications thereof can be a power source for digital home appliance such as DVD players using both blue- and red-type LD, and DVD-ROM/R/RW using both blue- and red-type LD for notebook PCs and desktop PCs.

2. Discussion of the Background

These days, as typified by cell phones, small mobile devices are considerably popular, and secondary batteries are used as a power supply for such small mobile device. Further, the above-described electronic apparatuses include a great number of ICs, and these ICs require power respective supply. The power supply required for operations of a load is generated in a DC-DC converter. If the power supply becomes unstable, operations of the load become unstable, and accordingly, malfunction will occur. Therefore, the DC-DC converter needs to generate a stable voltage as the power supply consistently.

FIG. 8 shows circuitry of a known DC-DC converter 201. The DC-DC converter 201 includes a control circuit 202 formed on a one-chip IC device, and multiple external elements. A signal SG1 output from the control circuit 202 is supplied to a gate of an output transistor 203 that is an enhanced N-channel MOS (negative channel metal oxide semiconductor) transistor.

A supply voltage input terminal VIN is connected to one terminal of a coil 204 for increasing voltage, and the other terminal of the coil 204 is connected to a drain of the output transistor 203. A source of the output transistor 203 is connected to ground (GND). Additionally, a diode 205 is connected between the drain and the source of the output transistor 203. More specifically, an anode of the diode 205 is connected to the source of the transistor 203, and a cathode of the diode 205 is connected to the drain of the transistor 203.

A junction node between the coil 204 and the output transistor 203 is connected to an anode of a diode 206, and a cathode of the diode 206 is connected to an output terminal 208. The output terminal 208 is connected to ground GND via a smoothing capacitor 207. In other words, a smoothing circuit formed by both the smoothing capacitor 207 and the coil 204 smoothes an output voltage VOUT. Further, the output terminal 208 is connected to the control circuit 202, and the output voltage VOUT is provided to the control circuit 202.

The control circuit 202 includes an error amplification circuit 211, a reference-voltage generation circuit 215, a PWM (Pulse Width Modulation) comparison circuit 212, a triangular-wave generation circuit 213, and an output control circuit 214.

The error amplification circuit 211 has an inverting input terminal, a non-inverting input terminal, and an output terminal. The inverting input terminal of the error amplification circuit 211 receives a voltage VDIV generated by dividing the output voltage VOUT from the output terminal 208 by feedback resistors 216 and 217. The non-inverting input terminal of the error amplification circuit 211 receives a reference voltage VREF from the reference-voltage generation circuit 215.

In the error amplification circuit 211, a series circuit, not shown, that includes a phase compensating capacitor and a resistor is connected between the output terminal of the error amplification circuit 211 and the inverting input terminal, thereby preventing oscillation of the error amplification circuit 211.

The error amplification circuit 211 compares the reference voltage VREF with the voltage VDIV that is generated by dividing output voltage VOUT by feedback resistors 216 and 217 with the reference voltage VREF. Therefore, the error amplification circuit 211 generates an error output signal SG2 by amplifying differences between the voltage VDIV and VREF, and outputs the error output signal SG2 to the PWM comparison circuit 212, in a subsequent stage.

The PWM comparison circuit 212 has an inverting input terminal, a non-inverting input terminal, and an output terminal. The non-inverting input terminal of the PWM comparison circuit 212 receives the error output signal SG2 from the error amplification circuit 211, and the inverting input terminal of the PWM comparison circuit 212 receives a triangular wave signal SG3 from the triangular-wave generation circuit 213. The PWM comparison circuit 212 compares the error output signal SG2 and the triangular wave signal SG3.

The PWM comparison circuit 212 outputs a pulse signal to the output control circuit 214 as a duty control signal SG4 that turns low when the triangular wave signal SG3 has a voltage higher than the error output signal SG2, and turns high when the triangular wave signal SG3 has a voltage equal to or smaller than the error output signal SG2.

The output control circuit 214 outputs to the gate of the output transistor 203 the duty control signal SG4 from the PWM comparison circuit 212, as above-described output signal SG1.

The DC-DC converter 201 having the configuration described above switches the output transistor 203 between on and off based on the output signal SG1 output from the control circuit 202, thereby keeping the output voltage VOUT at a predetermined voltage value.

When the output voltage decreases, the level of the error output signal SG2 of the error amplification circuit 211 rises. On the other hand, when the output voltage increases, the level of the error output signal SG2 of the error amplification circuit 211 declines.

In the PWM comparison circuit 212, when the level of the error output signal SG2 rises, the period during which the level of the triangular wave signal SG3 is higher than that of the error output signal SG2 is shorter, therefore, a period during which the duty control signal SG4 is high (hereinafter "high level signal period") becomes longer. That is, a duty ratio of signal SG4 increases.

By contrast, in the PWM comparison circuit 212, when the level of the error output signal SG2 declines, the period during which the signal level of the triangular wave signal SG3 is higher than that of the error output signal SG2 is longer, therefore, the high level signal period of the duty control signal SG4 becomes shorter. That is, the duty ratio of signal SG4 decreases.

Further, as shown in FIG. 9B, when a slope of the triangular wave output from the triangular-wave generation circuit 213 shows an identical linearity, it is possible to obtain the stable output voltage by feedback of the output voltage VOUT. However, actually, as shown in FIGS. 9A and 9B, the slope of the triangular wave is a non-linear. Due to the non-linearity of the slope, the pulse width of a subsequent duty control signal from the PWM comparison circuit 212 fluctuates, which is a problem.

For example, as shown in FIG. 9A, when the output voltage VOUT is high, the DC-DC converter needs to reduce the pulse width, and therefore, the level of the error output signal SG2 is lowered. After one clock (CLK), the level of the error output signal SG2 is lowered, and at a non-linear part of the slope of the triangular wave, the pulse width becomes shorter than that for the identical linearity shown in FIG. 9B.

By contrast, when the triangular wave has the slope shapes shown in FIG. 9C, the pulse width expands to become greater than that for the identical linearity shown in FIG. 9B.

As described above, since the output triangle slope has such a non-linear shape, it can take a longer time to converge on a required voltage, and at worst, the DC-DC converter can fail to generate the required output voltage.

Several approaches have been tried in an attempt to make the DC-DC converter generate a stable voltage consistently.

In one known configuration of the DC-DC converter, when an output voltage is lower than a predetermined voltage that is offset from a reference voltage, an output transistor is turned on while a duty control signal has a maximum duty ratio by comparing an error output signal and a triangular wave signal. In this configuration, even if the output voltage drops below the predetermined voltage, the output transistor is kept on in the period during which the output voltage is low, and accordingly the output voltage can rise quickly.

However, although the above-mentioned approach considers the case in which the output voltage drops significantly, it does not consider the case in which the triangular wave is not linear. Thus, a required pulse width signal cannot be generated in the case in which an error output signal is lower when the triangular wave is not linear.

BRIEF SUMMARY

In an aspect of this disclosure, there is provided a DC-DC converter that includes an error amplifying circuit that outputs an error signal by amplifying a difference between a reference voltage and a feedback voltage for an output voltage generated by switching an output transistor between on and off, a triangular wave generation circuit that generates a triangular wave, a PWM comparison circuit that compares the triangular wave and the error signal and outputs a duty control signal having a duty ratio based on the comparison, a pulse width control circuit that controls a pulse width of the duty control signal output from the PWM comparison circuit, and a drive circuit that drives the output transistor according to a signal output from the pulse width control circuit.

In another aspect, there is provided a DC-DC converter that can perform reliable pulse-width modulation to output a stable output voltage by controlling the modulation of the pulse widths using the linear part of the triangular wave.

BRIEF DESCRIPTION OF THE DRAWINGS

The aforementioned and other aspects, features and advantages will be better understood by reference to the following detailed description when considered in connection with the accompanying drawings, wherein.

DETAILED DESCRIPTION OF PREFERRED EMBODIMENTS

Figure 1:
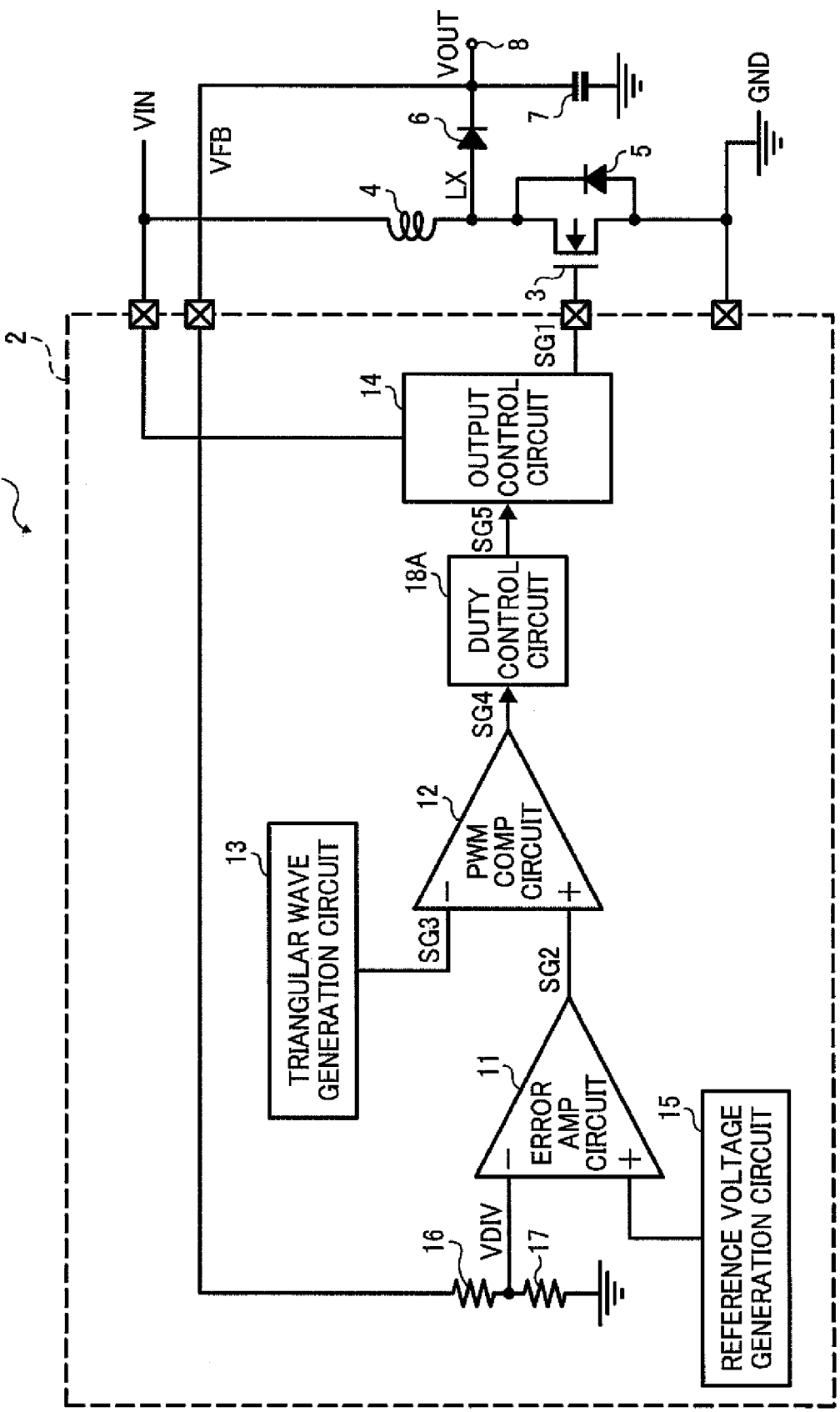
FIG. 1 illustrates circuitry of a DC-DC converter according to an illustrative embodiment of the present invention.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve a similar result.

Referring now to the drawings, wherein like reference numerals designate identical or corresponding parts throughout the several views thereof, particularly to FIGS. 1 through 3, a DC-DC converter according to an example embodiment of the present invention is described below.

FIG. 1 illustrates circuitry of a DC-DC converter 1 according to the present embodiment. The DC-DC converter 1 includes a control circuit 2 formed on a one-chip IC device, and multiple external elements. A signal SG1 output from the control circuit 2 is supplied to a gate of an output transistor 3 that is an enhanced N-channel MOS transistor.

A supply voltage input terminal VIN is connected to one terminal of a coil 4 for increasing voltage, and the other terminal of the coil 4 is connected to a drain of the output transistor 3. A source of the output transistor 3 is connected to ground (GND).

Additionally, a diode 5 is connected between the drain and the source of the output transistor 3, more specifically, an anode of the diode 5 is connected to the source of the transistor 3, and a cathode of the diode 5 is connected to the drain of the transistor 3.

A junction node between the coil 4 and the output transistor 3 is connected to an anode of a diode 6, and a cathode of the diode 6 is connected to an output terminal 8.

The output terminal 8 is connected to the ground GND via a smoothing capacitor 7. In other words, a smoothing circuit formed by both the smoothing capacitor seven and the coil 4 smoothes an output voltage VOUT.

Further, the output terminal 8 is connected to the control circuit 2, and the output voltage VOUT is provided to the control circuit 2.

The control circuit 2 includes an error amplification circuit 11, a reference voltage generation circuit 15, a PWM (Pulse Width Modulation) comparison circuit 12, a triangular-wave generation circuit (oscillator) 13, a pulse-width control circuit 18A, and an output control circuit 14.

The error amplification circuit 11 has an inverting input terminal, a non-inverting input terminal, and an output terminal. The inverting input terminal of the error amplification circuit 11 receives a voltage Vdiv generated by dividing the output voltage VOUT (serves as a feedback voltage VFB) output from the output terminal 8 by feedback resistors 16 and 17.

The non-inverting input terminal of the error amplification circuit 11 receives a reference voltage from the reference voltage generation circuit 15. In the error amplification circuit 11, a series circuit, not shown, that includes a phase compensating capacitor and a resistor is connected between the output terminal and the inverting input terminal, thereby preventing oscillation of the error amplification circuit 11.

The error amplification circuit 11 compares the reference voltage VREF with the voltage Vdiv that is generated by dividing the output voltage VOUT by the feedback resistors 16 and 17. Therefore, the error amplification circuit 11 produces an error output signal SG2 by amplifying differences between the voltage Vdiv and the reference voltage VREF, and outputs the error output signal SG2 to the PWM comparison circuit 12 in a subsequent stage.

The PWM comparison circuit 12 has an inverting input terminal, a non-inverting input terminal, and an output terminal. The non-inverting input terminal of the PWM comparison circuit 12 receives the error output signal SG2 from the error amplification circuit 11, and the inverting input terminal of the PWM comparison circuit 12 receives a triangular wave signal SG3 from the triangular-wave generation circuit 13. The PWM comparison circuit 12 compares the error output signal SG2 with the triangular wave signal SG3.

The PWM comparison circuit 12 outputs a pulse signal to the pulse-width control circuit 18A as a duty control signal SG4 that tunes low when the triangular wave signal SG3 has a voltage higher than the error output signal SG2 and turns high when the triangular wave signal SG3 has a voltage equal to or smaller than the error output signal SG2.

The pulse-width control circuit 18A controls a pulse width of the duty control signal SG4. In the present embodiment, the pulse-width control circuit 18A reduces the duty ratio of the duty control signal SG4 by 10% and outputs a control signal SG5 whose pulse width is controlled.

The output control circuit 14 serving as a drive circuit outputs to the gate of the output transistor 3 the control signal SG5 from the pulse-width control circuit 18A as the above-described signal SG1.

The DC-DC converter 1 having the configuration described above switches the output transistor 3 between on and off based on the signal SG1 output from the control circuit 2. Therefore, the DC-DC converter 1 keeps the output voltage VOUT at the predetermined voltage value.

When the output voltage VOUT decreases, the level of the error output signal SG2 of the error amplification circuit 11 rises.

On the other hand, when the output voltage increases, the level of the error output signal SG2 of the error amplification circuit 11 declines.

In the PWM comparison circuit 12, when the level of the error output signal SG2 rises, the period during which the level of the triangular wave signal SG3 is higher than that of the error output signal SG2 is shorter. Therefore, a period during which the duty control signal SG4 is high (hereinafter "high level signal period") becomes longer. That is, a duty ratio of SG4 increases.

By contrast, in the PWM comparison circuit 12, when the level of the error output signal SG2 declines, the period during which the signal level of the triangular wave signal SG3 is higher than that of the error output signal SG2 is shorter. Therefore, the high level signal period of the duty control signal SG4 becomes shorter. That is, the duty ratio of SG4 decreases.

In the present embodiment, the DC-DC converter 1 is set to perform negative feedback so that a duty ratio of a signal LX at a junction node between the coil 4 and the output transistor 3 is kept at 15%. The triangular-wave generation circuit 13 outputs the triangular wave signal SG3 while operating at a frequency of 1 MHz, for example.

The pulse-width control circuit 18A is designed to control the duty control signal SG4 so that its duty ratio is reduced by 10%. The pulse-width control circuit 18A outputs the signal SG5 whose pulse width is reduced by 10% from that of the duty control signal SG4, and the signal SG5 controls the output control circuit 14. As a result, the level of the error output signal SG2 becomes higher by 10% than that of the signal LX.

Therefore, in the present embodiment, when the duty ratio of the signal LX is set to 15%, the error output signal SG2 is output at a duty ratio of 25%. Thus, the duty control signal SG4 of the PWM comparison circuit 12 is output at a duty ratio of 25% as well.

Then, because the pulse-width control circuit 18A reduces the pulse width of the duty control signal SG4 by 10%, the signal SG5 output from the pulse-width control circuit 18A is output at a duty ratio of 15%.

Figure 2:
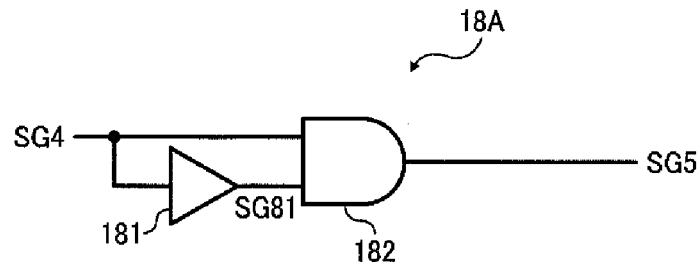
FIG. 2 is a diagram illustrating circuitry of a pulse-width control circuit shown in FIG. 1.

FIG. 2 shows an example of a configuration of the above-described pulse-width control circuit 18A. FIG. 2 is a diagram illustrating circuitry of the pulse-width control circuit 18A according to the present embodiment. The pulse-width control circuit 18A includes a delay circuit 181 that delays the duty control signal SG4 for a predetermined or given time, and an AND circuit 182 that receives the duty control signal SG4 and a signal SG81 from the delay circuit 181.

The AND circuit 182 outputs the signal SG5 whose pulse width is controlled so that its duty ratio is reduced by 10% from that of the signal SG4. When the triangular-wave generation circuit 13 outputs the triangular wave while operating at a frequency of 1 MHz, for example, the delay circuit 181 delays the signal SG81 for 100 ns in order to reduce the duty ratio of the signal SG5 by 10%.

As described above with reference to FIGS. 9A and 9C, the triangular wave slope in the triangular-wave generation circuit 13 has a non-linear part.

Figure 9A:
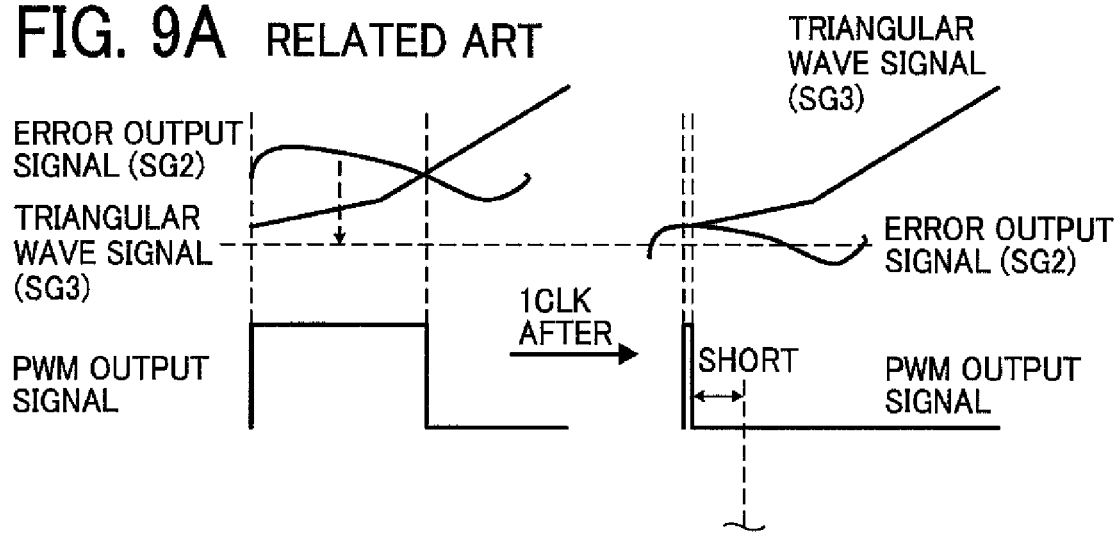
FIG. 9A, 9B, and 9C are waveform diagrams illustrating operations of the DC-DC converter shown in FIG. 8.
Figure 9B:
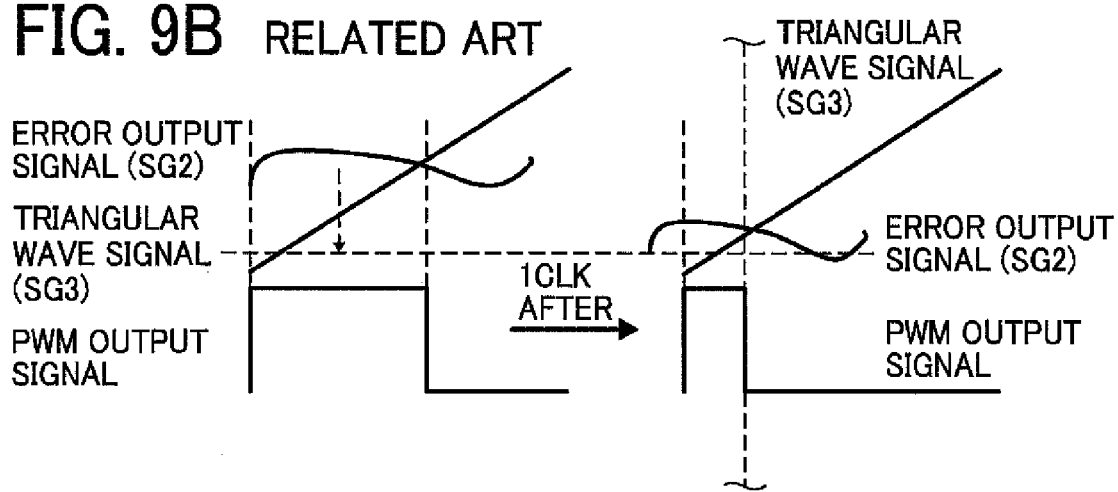
Figure 9C:
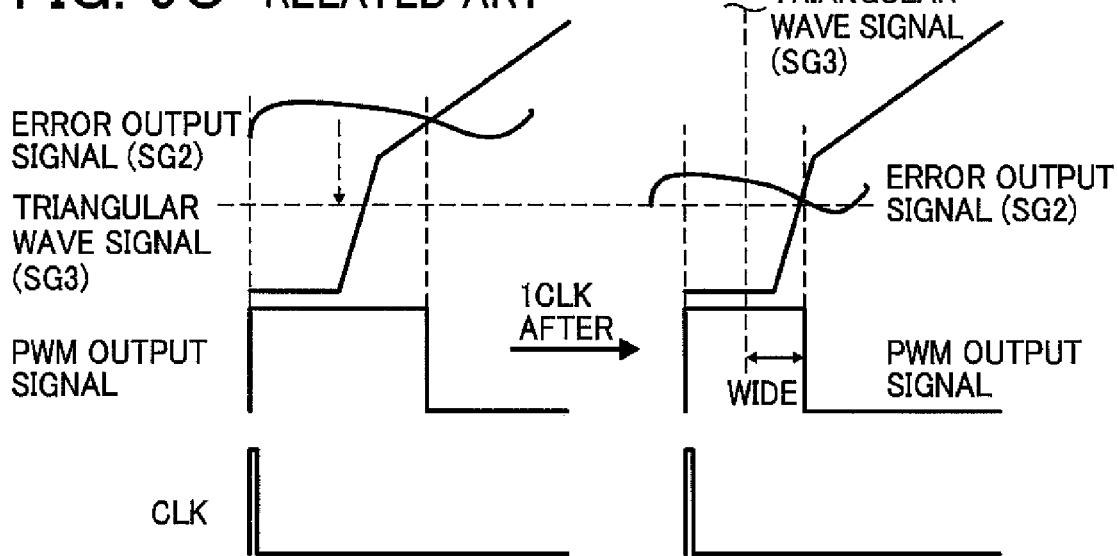

In the cases shown in FIGS. 9A and 9C, when there are no differences between the two signals that the error amplification circuit receives, in other words, between the input voltage and the output voltage, the error output signal SG2 is provided to the non-linear part that is a lower part of the slope of the triangular wave. In this case, as described-above, the pulse width of the signal SG4 will be out of a required pulse width.

Therefore, in the present embodiment, the pulse-width control circuit 18A outputs the signal SG5 whose duty ratio is reduced by 10%. As a result, the error output signal SG2 is raised, and accordingly, the error output signal SG2 is provided to the linear part of the triangular wave that is output from the triangular-wave generation circuit 13.

Figure 3:
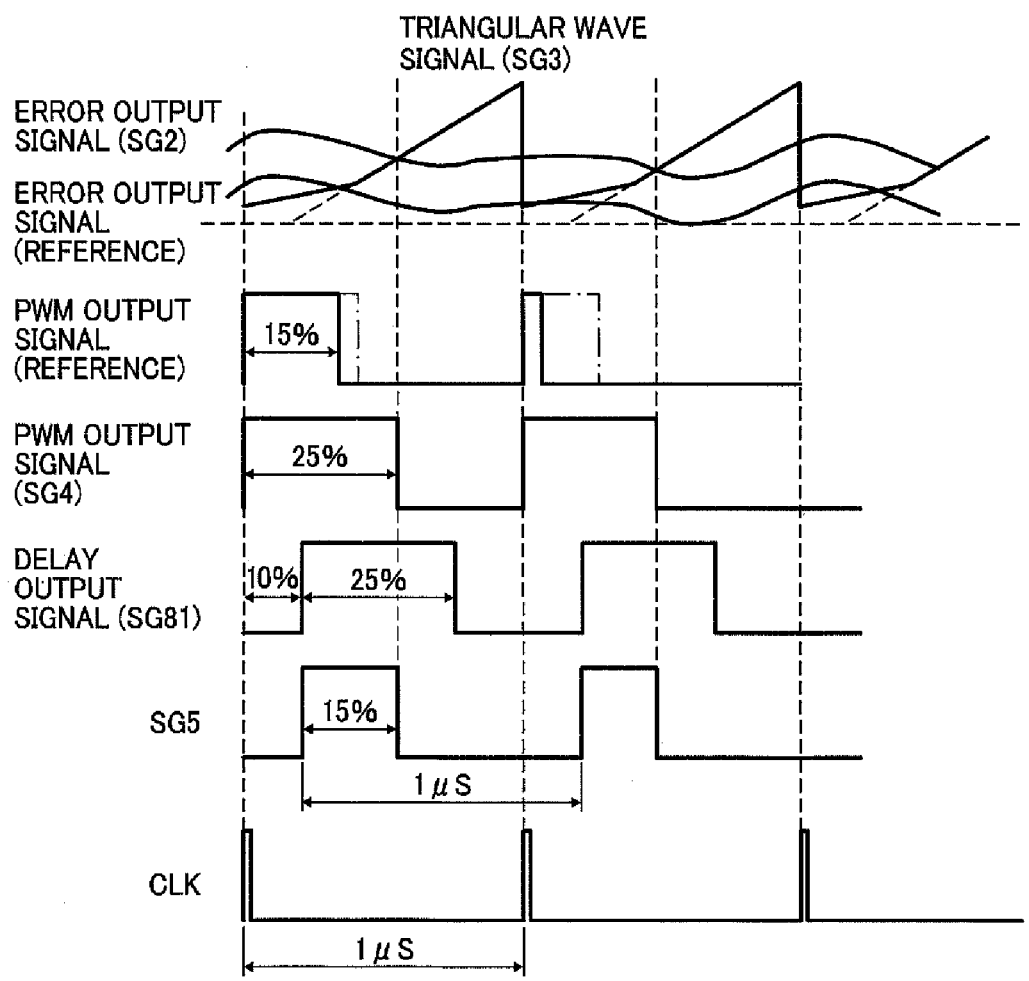
FIG. 3 is a waveform diagram illustrating operations of the DC-DC converter shown in FIG. 1.

FIG. 3 is a waveform diagram illustrating operations of the DC-DC converter 1 of the present embodiment.

Referring to FIGS. 1 though 3, the operations of the DC-DC converter 1 according to the present embodiment are described below. In FIG. 3, the error output signal SG2 of the known DC-DC converter 201 shown in FIG. 8 and the PWM output signal SG4 based on that error output signal SG2 are also shown as a reference.

Referring to FIG. 3, a slope of the output signal SG3 (OSC output signal) of the triangular-wave generation circuit 13 is not an ideal triangular wave. More specifically, the non-linear part is situated at a start-up part and a nearing an end part in cycles of the triangular wave. If there are no differences between the input voltage and the output voltage, the error output signal SG2 becomes lower.

Figure 8:
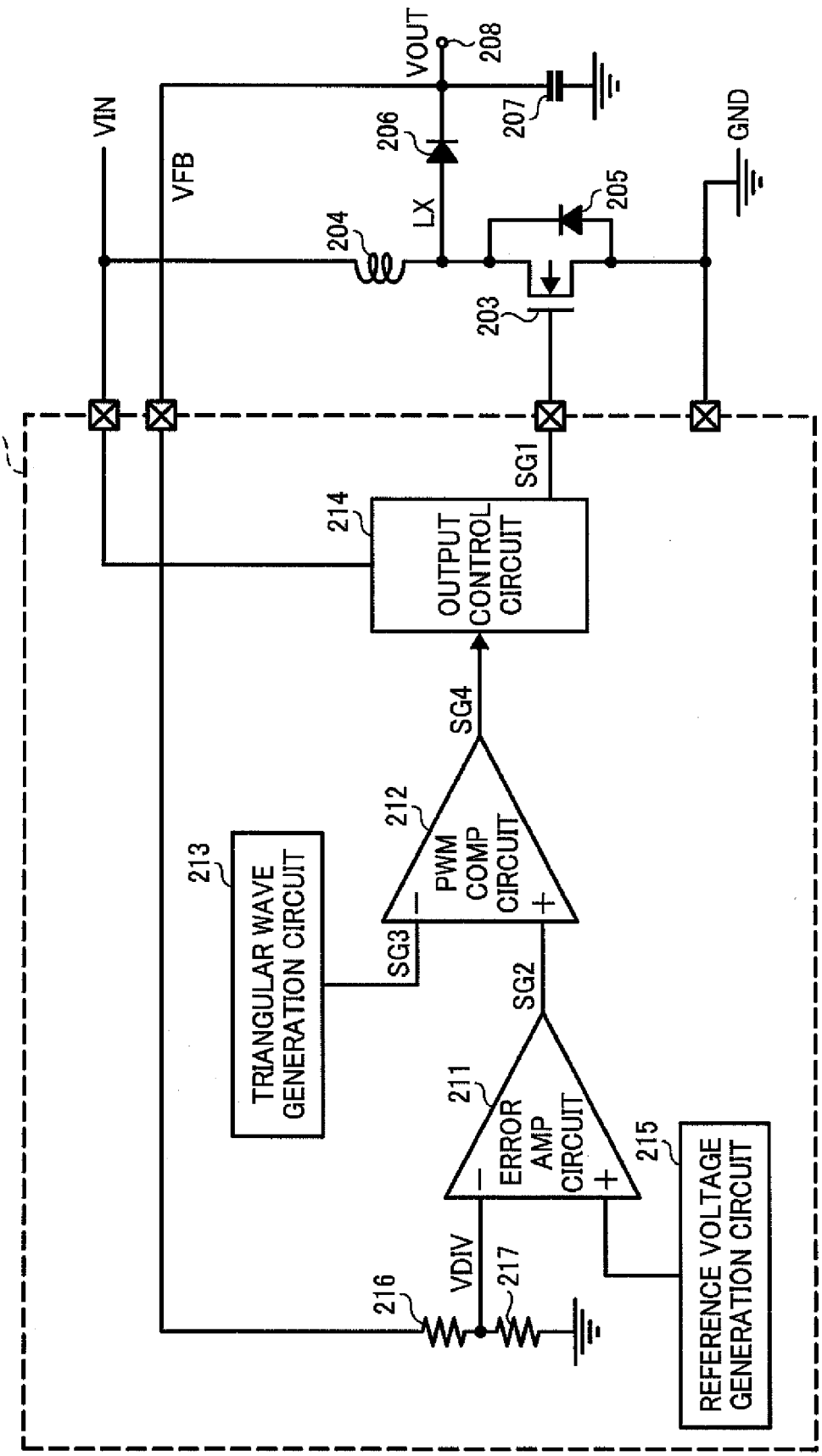
FIG. 8 is circuitry illustrating a known DC-DC converter.

In the known DC-DC converter 201 shown in FIG. 8, the error output signal is compared with the non-liner part of the output of the triangular-wave generation circuit 13, and as a result, the pulse width of the PWM output shown as REFERENCE in FIG. 3 is narrower than the required pulse width.

The required pulse to the identical slope is shown as a dashed line.

By contrast, in the DC-DC converter 1 according to the present embodiment, the pulse-width control circuit 18A outputs the control signal SG5 whose pulse width is reduced by 10%, and this signal SG5 controls the control circuit 14. As a result, the level of the error output signal SG2 becomes higher by 10% than that of the signal LX.

Therefore, in the present embodiment, when the duty ratio of the signal LX is set to 15%, the period during which the signal level of the triangular wave signal SG3 is higher than that of error output signal SG2 is 25% of 1 cycle. Thus, the level of the error output signal SG2 in the DC-DC converter 1 that includes the pulse-width control circuit 18 reducing the duty ratio 10% is raised by 10% compared to the error output signal SG2 in a DC-DC converter that does not have such a pulse-width control circuit. AS a result, the duty control signal SG4, that is, the PWM output, of the PWM comparison circuit 12 is output at a duty ratio of 25% as well.

Subsequently, the signal SG4 is delayed by 10% in the delay circuit 181 shown in FIG. 2 of the pulse-width control circuit 18A. Then, the duty control signal SG4 and the output signal SG81 from the delay circuit 181 are provided to the AND circuit 182, and thus, the AND circuit 182 outputs the control signal SG5 whose duty ratio is 15%.

The control signal SG5 can be output at a pulse width identical or similar to the pulse width corresponding to the ideal slope of the triangular wave output from the triangular-wave generation circuit 13.

Therefore, even if there are no differences between the input voltage and the output voltage, the PWM operation can be stable.

Another embodiment of a pulse-width control circuit 18B is described below with reference to FIGS. 4 and 5.

Although its circuitry is similar to the circuitry of the DC-DC converter 1 shown in FIG. 1, a DC-DC converter according to the present embodiment has a pulse-width control circuit 18B that operates differently from that shown in FIG. 2.

In the first embodiment, the pulse-width control circuit 18A reduces the duty ratio of the duty control signal SG4 by 10%.

By contrast, in the second embodiment, the pulse-width control circuit 18B is designed to control the duty control signal SG4 so that it raises the duty ratio by 10% and outputs the signal SG5 whose pulse width is controlled. The pulse-width control circuit 18B outputs the signal SG5 whose pulse width is increased by 10% from that of the duty control signal SG4, and the signal SG5 controls the output control circuit 14. As a result, the level of the error output signal SG2 becomes lower by 10% than that of the signal LX.

Therefore, in the present embodiment, when the duty ratio of the signal LX is set to 95%, the period during which the signal level of the triangular wave signal SG3 is higher than that of the error output signal SG2 is 85% of 1 cycle. Thus, the level of the error output signal SG2 in the DC-DC converter 1 that includes the pulse-width control circuit 18 raising the duty ratio 10% is reduced by 10% compared to the error output signal SG2 in the DC-DC converter that does not have the pulse-width control circuit. Thus, the duty control signal SG4 of the PWM comparison circuit 12 can have a duty ratio of 85% as well. Then, because the pulse-width control circuit 18B raises the pulse width of the duty control signal SG4 by 10%, the signal SG5 output from the pulse-width control circuit 18B is output at a duty ratio of 95%.

In order to increase the duty ratio of the output signal SG5 to be provided to the output control circuit 14, the signal SG5 is controlled by using an upper part of the triangular wave SG3.

Figure 5:
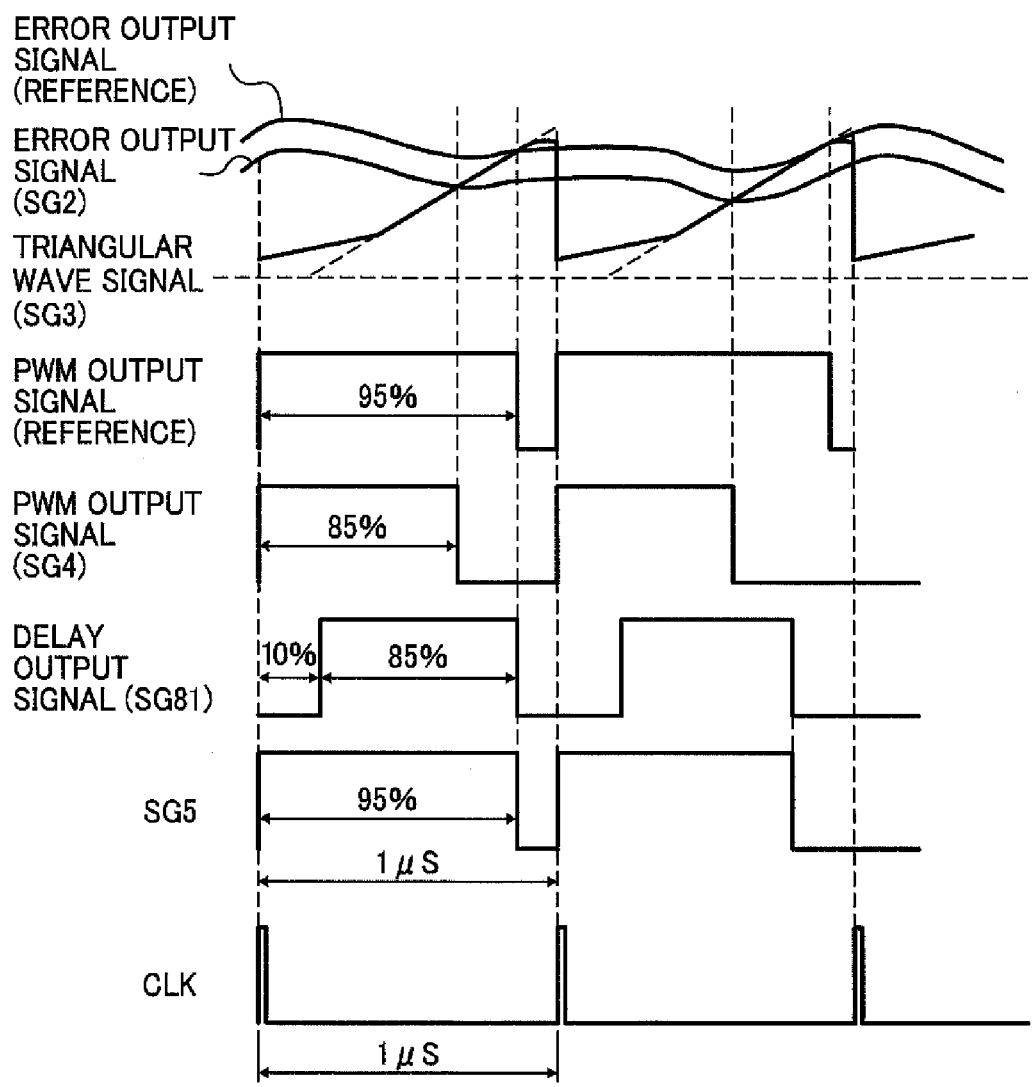
FIG. 5 is a waveform diagram illustrating operations of a DC-DC converter using the pulse-width control circuit shown in FIG. 4.

As shown in FIG. 5, the upper part of the triangular wave also has a non-linear part, and accordingly, if this part is used for controlling the pulse width of the signal SG4, the pulse width of the signal SG4 will fluctuate from the pulse width corresponding to an ideal slope.

Therefore, in the second embodiment, when the pulse-width control circuit 18B provides the output control circuit 14 with the output signal SG5 whose duty ratio is higher, the pulse-width control circuit 18B is designed to raise the duty ratio of the duty control signal SG4 by 10% and to lower the level of the output signal SG2 so as to control the signal SG4 using the linear part of the triangular wave.

The pulse-width control circuit 18B operated as described above can be configured as shown in FIG. 4, for example. FIG. 4 is a diagram illustrating circuitry of the pulse-width control circuit 18B according to the second embodiment. The pulse-width control circuit 18B includes a delay circuit 181 that delays the duty control signal SG4 for a predetermined or given time, and an OR circuit 183 that receives the duty control signal SG4 and a signal from the delay circuit 181. The OR circuit 183 outputs the signal SG5 whose pulse width is controlled so that its duty ratio is increased by 10%.

When the triangular-wave generation circuit 13 outputs the triangular wave while operating at a frequency of 1 MHz, for example, the delay circuit 181 delays the signal SG81 for 100 ns in order to raise the duty ratio of the signal SG5 by 10%.

FIG. 5 is a waveform diagram illustrating the operations of the DC-DC converter 1 when the pulse-width control circuit 18B of the second embodiment is used instead of the pulse-width control circuit 18A shown in FIG. 2.

Figure 4:
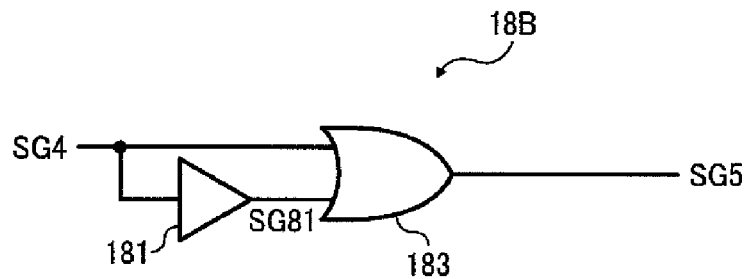
FIG. 4 is a diagram illustrating circuitry of a pulse-width control circuit according to another illustrative embodiment.

Referring to FIGS. 1, 4 and 5, the operation of DC-DC converter 1 according to the second embodiment is described below. In FIG. 5, the error output signal SG2 of the known DC-DC converter 201 shown in FIG. 8 and the PWM output signal SG4 based on the error output signal as a reference.

Referring to FIG. 5, a slope of the output signal (OSC output signal SG3) of the triangular-wave generation circuit 13 is not the ideal triangular wave. More specifically, the non-linear part is situated at a start-up part and a nearing an end part in cycles of the triangular wave.

In the known DC-DC converter 201 shown in FIG. 8, the error output signal shown as reference SG2 is compared with the non-liner part of the output of the triangular-wave generation circuit 13.

By contrast, in the DC-DC converter 1 according to the second embodiment, the pulse-width control circuit 18B outputs the control signal SG5 whose pulse width is increased by 10%, and this signal SG5 controls the control circuit 14. As a result, the level of the error output signal SG2 becomes lower by 10% than that of the signal LX.

Therefore, in the second embodiment, when the duty ratio of the signal LX is set to 95%, the error output signal SG2 has a duty ratio of 85%, and the error output signal is reduced. AS a result, the duty control signal SG4, that is PWM output, of the PWM comparison circuit 12 is output at the duty ratio of 85% as well.

Subsequently, the signal SG4 is delayed by 10% in the delay circuit 181 shown in FIG. 4 of the pulse-width control circuit 18B. Then, the duty control signal SG4 and the output signal SG81 from the delay circuit 181 are provided to the OR circuit 183, and thus, the OR circuit 183 outputs the control signal SG5 whose duty ratio is 95%.

The control signal SG5 can be output a pulse width identical or similar to the pulse width corresponding to the ideal slope of the pulse width from triangular-wave generation circuit 13.

Figure 6:
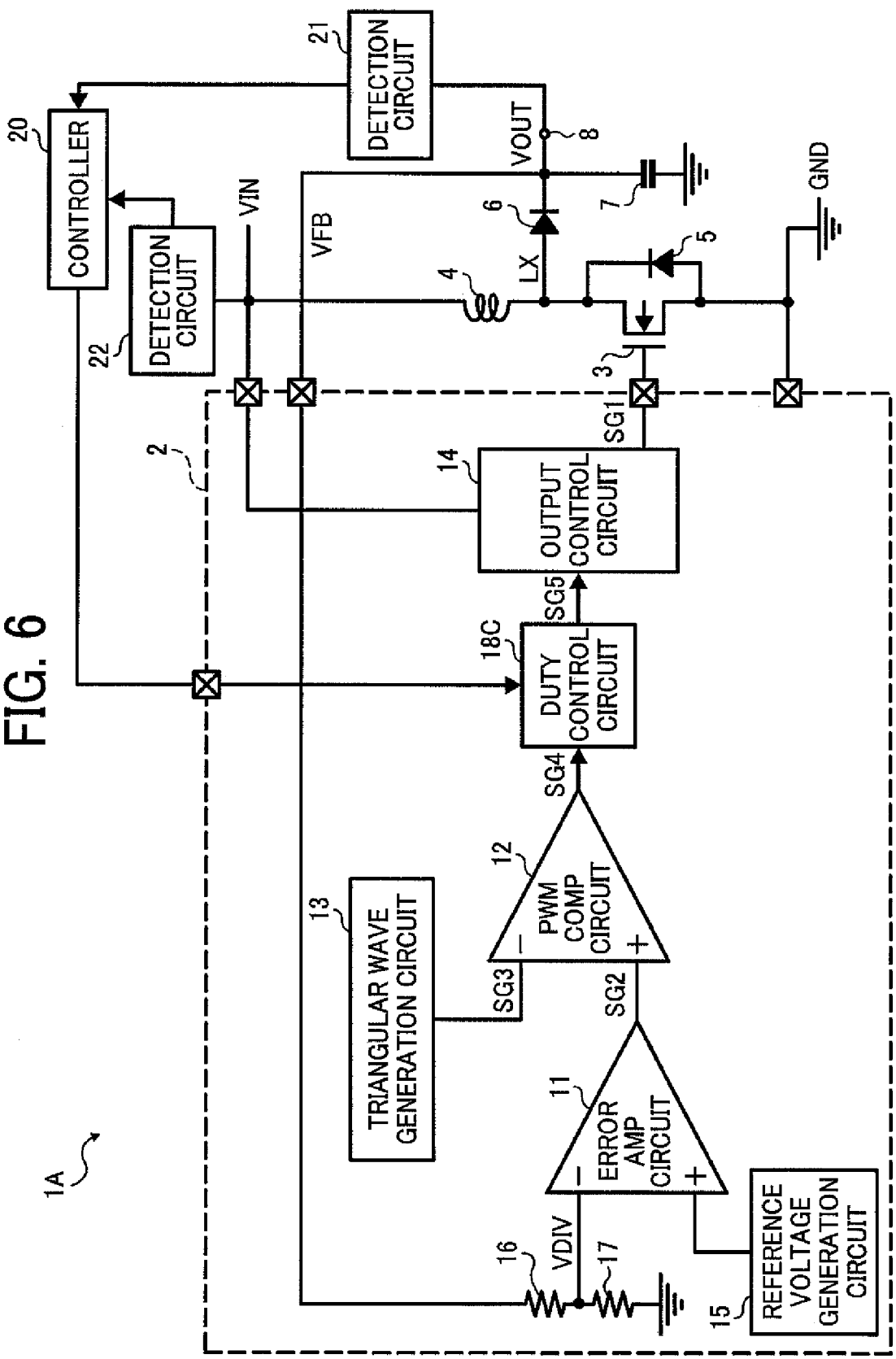
FIG. 6 is circuitry of a DC-DC converter according to another illustrative embodiment.
Figure 7:
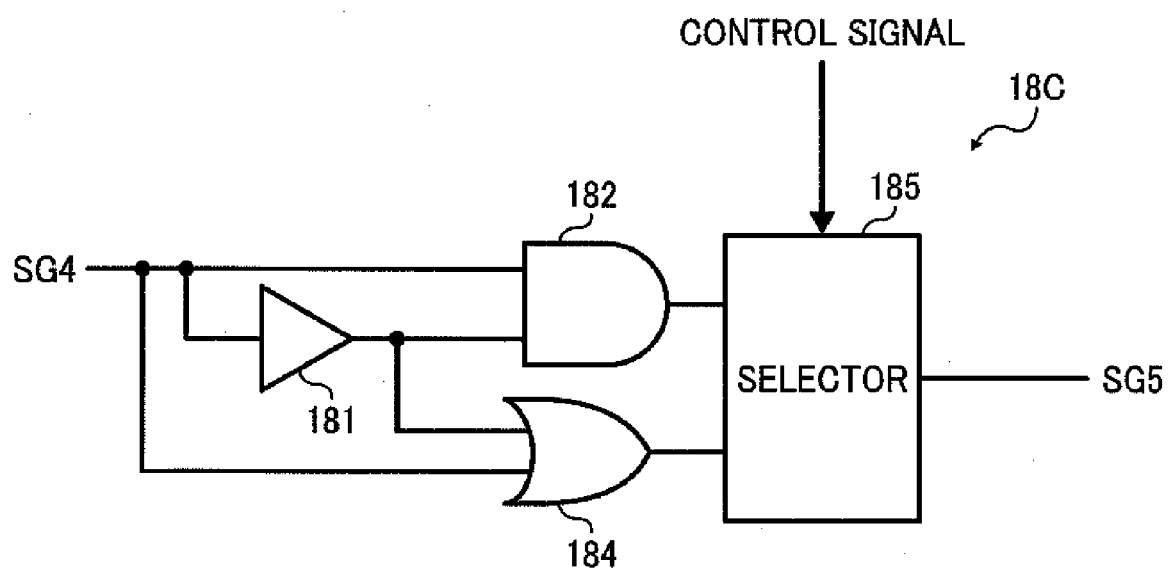
FIG. 7 is a diagram illustrating circuitry of a pulse-width control circuit shown in FIG. 6.

FIG. 6 illustrates circuitry of a DC-DC converter 1A according to the third embodiment of the present invention. FIG. 7 is a diagram illustrating circuitry of a pulse-width control circuit 18C used in the DC-DC converter 1A shown in FIG. 6 according to the third embodiment. The DC-DC converter 1A includes a control circuit 20 and detections circuits 21 and 22 in addition to the elements included in the DC-DC converter 1 shown in FIG. 1.

In the third embodiment, the pulse-width control circuit 18C includes a first circuit, a second circuit, and a selector 185. The first circuit consists of a delay circuit 181 and an AND circuit 182, and outputs the signal SG5 whose pulse width is reduced by a predetermined or given amount. The second circuit consists of the delay circuit 181 and an OR circuit 183, and outputs the signal SG5 whose pulse width is raised by a predetermined or given amount.

The selector 185 selects either the first circuit or the second circuit and outputs the signal SG5 that is output from the selected circuit. The selector 185 is controlled based on the input voltage and the output voltage.

Therefore, in the present embodiment, the input voltage and the output voltage is detected by the detection circuits 21 and 22, and signals from these detection circuits 21 and 22 are provided to the controller 20.

Based on the relation between the input voltage and the output voltage, the controller 20 controls the selector 185 to select the first circuit when the error output signal is situated in a portion lower than the center part of the triangular wave and to select the second circuit when the error output signal is situated in a portion above the center part of the triangular wave.

By controlling the pulse widths as described above, modulation of pulse width using the linear part of the triangular wave can be performed. Therefore, the present invention can provide a DC-DC converter that can perform reliable pulse-width modulation to output a stable output voltage.

It is to be noted that although the description above concerns examples in which the pulse-width control circuit increases or decreases the duty ratio by 10%, such is but example thereof and the present invention is not limited to the above-descried embodiments. That is, the amount by which the duty ratio can be adjusted depends on the circuits, the applications for which the DC-DC converter is used, and the like.

Numerous additional modifications and variations are possible in light of the above teachings. It is therefore to be understood that, within the scope of the appended claims, the disclosure of this patent specification may be practiced otherwise than as specifically described herein. Further, the claims are also intended to various alternations in doctrine of equivalents to the appended claim.

What is claimed is:

1. A DC-DC converter comprising:
an error amplifying circuit to output an error signal by amplifying a difference between a reference voltage and a feedback voltage for an output voltage generated by switching an output transistor between on and off;
a triangular wave generation circuit to generate a triangular wave;
a PWM comparison circuit to compare the triangular wave with the error signal and output a duty control signal having a duty ratio based on the comparison;
a pulse width control circuit to control a pulse width of the duty control signal output from the PWM comparison circuit; and
a drive circuit to drive the output transistor according to a signal output from the pulse width control circuit,
wherein the pulse width control circuit comprises:
a first circuit to reduce the pulse width of the duty control signal output from the PWM comparison circuit by a predetermined amount;
a second circuit to increase the pulse width of the duty control signal output from the PWM comparison circuit by a predetermined amount; and
a selector to select and output one of signals output from the first circuit and the second circuit,
the selector being controlled based on the output voltage and an input voltage.

2. The DC-DC converter according to claim 1, wherein the pulse width control circuit reduces the pulse width of the duty control signal output from the PWM comparison circuit by a predetermined amount.

3. The DC-DC converter according to claim 2, wherein the pulse width control circuit further comprises:
a delay circuit to delay the duty control signal for a predetermined time; and
an AND circuit to receive the duty control signal and a signal from the delay circuit.

4. The DC-DC converter according to claim 1, wherein the pulse width control circuit increases the pulse width of duty control signal output from the PWM comparison circuit by a predetermined amount.

5. The DC-DC converter according to claim 4, wherein the pulse width control circuit further comprise:
a delay circuit to delay the duty control signal for a predetermined time; and
an OR circuit to receive the duty control signal and a signal from the delay circuit.

6. An electronic apparatus, comprising:
a memory unit that stores data;
a processing unit that processes selected data obtained from the memory unit; and
a DC-DC converter that supplies operational power to the memory unit and processing unit, the DC-DC converter comprising:
an error amplifying circuit to output an error signal by amplifying a difference between a reference voltage and a feedback voltage for an output voltage generated by switching an output transistor between on and off;
a triangular wave generation circuit to generate a triangular wave;
a PWM comparison circuit to compare the triangular wave with the error signal and output a duty control signal having a duty ratio based on the comparison;

a pulse width control circuit to control a pulse width of the duty control signal output from the PWM comparison circuit; and a drive circuit to drive the output transistor according to a signal output from the pulse width control circuit, wherein the pulse width control circuit comprises:

a first circuit to reduce the pulse width of the duty control signal output from the PWM comparison circuit by a predetermined amount;

a second circuit to increase the pulse width of the duty control signal output from the PWM comparison circuit by a predetermined amount; and a selector to select and output one of signals output from the first circuit and the second circuit, the selector being controlled based on the output voltage and an input voltage.

7. The electronic apparatus according to claim 6, wherein the pulse width control circuit reduces the pulse width of the duty control signal output from the PWM comparison circuit by a predetermined amount.

8. The electronic apparatus according to claim 7, wherein the pulse width control circuit further comprises:

a delay circuit to delay the duty control signal for a predetermined time; and an AND circuit to receive the duty control signal and a signal from the delay circuit.

9. The electronic apparatus according to claim 6, wherein the pulse width control circuit increases the pulse width of duty control signal output from the PWM comparison circuit by a predetermined amount.

10. The electronic apparatus according to claim 9, wherein the pulse width control circuit further comprise:

a delay circuit to delay the duty control signal for a predetermined time; and an OR circuit to receive the duty control signal and a signal from the delay circuit.

11. A method for controlling a DC-DC converter, the method comprising:

outputting an error signal by amplifying a difference between a reference voltage and a feedback voltage for an output voltage generated by switching an output transistor between on and off;

generating a triangular wave signal;

comparing the triangular wave signal with the error signal, and outputting a duty control signal having a duty ratio based on the comparison;

controlling a pulse width of the duty control signal by reducing the pulse width of the duty control signal by a predetermined amount for output as a reduced signal, increasing the pulse width of the duty control signal by a predetermined amount for output as an increased signal, selecting one of the reduced signals and the increased signal for output as a control signal, and controlling the selection based on the output voltage and an input voltage; and driving the output transistor according to the control signal.

12. The method according to claim 11, wherein the pulse width of the duty control signal is reduced by delaying the duty control signal for a predetermined time as a delayed signal, and outputting the reduced signal that turns high only when both the duty control signal and the delayed signal are high.

13. The method according to claim 11, wherein the pulse width of the duty control signal is increased by delaying the duty control signal for a predetermined time as a delayed signal, and outputting the increased signal that turns high when one or both the duty control signal and the delayed signal are high.

* * * * *